(12) United States Patent
Shao et al.

(10) Patent No.: US 10,884,467 B2
(45) Date of Patent: Jan. 5, 2021

(54) SYSTEM EVENTS IN UNIVERSAL SERIAL BUS (USB) DEVICES

(71) Applicant: Hewlett-Packard Development Company, L.P., Houston, TX (US)

(72) Inventors: Hua Shao, Shanghai (CN); Chun-Qin Zhou, Shanghai (CN); Xiao-Dong Zhang, Shanghai (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/772,215

(22) PCT Filed: Feb. 22, 2016

(86) PCT No.: PCT/CN2016/074224
§ 371 (c)(1),
(2) Date: Apr. 30, 2018

(87) PCT Pub. No.: WO2017/143471
PCT Pub. Date: Aug. 31, 2017

(65) Prior Publication Data
US 2018/0321725 A1  Nov. 8, 2018

(51) Int. Cl.
*G06F 1/3215* (2019.01)
*G06F 1/3206* (2019.01)
(Continued)

(52) U.S. Cl.
CPC ............ *G06F 1/266* (2013.01); *G06F 1/3206* (2013.01); *G06F 1/3215* (2013.01);
(Continued)

(58) Field of Classification Search
CPC ...................................................... G06F 1/266
See application file for complete search history.

(56) References Cited

U.S. PATENT DOCUMENTS 8,135,891 B2  3/2012  Lydon et al.
9,218,311 B2  12/2015  Kobayashi
(Continued)

FOREIGN PATENT DOCUMENTS

| CN | 105224494 A | 1/2016 |
| WO | WO-2015109334 A1 | 7/2015 |
| WO | WO-2015195968 A1 | 12/2015 |

OTHER PUBLICATIONS

Sadat, A, et al, "USB Type-C Represents Breakthrough Connectivity", Dec. 2015.

*Primary Examiner* — Kim Huynh
*Assistant Examiner* — Eric Chang
(74) *Attorney, Agent, or Firm* — HPI Patent Department

(57) ABSTRACT

Techniques relating to communicating system events in universal serial bus (USB) power delivery (PD) devices are described. In an example, a USB PD controller receives a notification of a system event in a first device associated with the USB PD controller, the system event being based on one of a change in machine state of the first device and occurrence of a user interaction event in the first device. A PD protocol based message, indicative of the system event in the first device, is generated. The PD protocol based message provides for activation of a predefined profile setting in a second device, wherein the second device is to interface with the first device through the USB PD controller.

15 Claims, 5 Drawing Sheets

(51) Int. Cl.
  *G06F 1/26*   (2006.01)
  *G06F 13/42*  (2006.01)
  *G06F 13/38*  (2006.01)

(52) U.S. Cl.
  CPC ........ *G06F 13/4282* (2013.01); *G06F 13/385* (2013.01); *G06F 2213/0042* (2013.01); *Y02D 10/151* (2018.01)

(56) References Cited

U.S. PATENT DOCUMENTS

| | | | |
|---|---|---|---|
| 2012/0239945 A1* | 9/2012 | Balasubramanian ... | G06F 1/266 713/300 |
| 2013/0326251 A1 | 12/2013 | Adewale et al. | |
| 2014/0208134 A1* | 7/2014 | Waters ................. | G06F 13/385 713/310 |
| 2015/0269102 A1 | 9/2015 | Inha et al. | |
| 2015/0378409 A1 | 12/2015 | Dunstan | |

\* cited by examiner

SYSTEM EVENTS IN UNIVERSAL SERIAL BUS (USB) DEVICES

BACKGROUND

Universal Serial Bus (USB) is used as an interface to transfer data as well as power between devices. For example, a mobile phone may be charged via a USB port of a laptop while simultaneously may also be used to exchange data between the mobile phone and the laptop.

USB Power Delivery (PD) protocol provides for exchange of power between two USB PD capable devices. The USB PD protocol defines a mechanism for paired USB PD capable devices to exchange power delivery capabilities and negotiate power requirements. Accordingly, one of the devices acts as a source while other functions as a sink, and the current and/or voltage that the source may supply to the sink is negotiated between the two devices.

BRIEF DESCRIPTION OF FIGURES

The following detailed description references the drawings, wherein.

DETAILED DESCRIPTION

Figure 1:
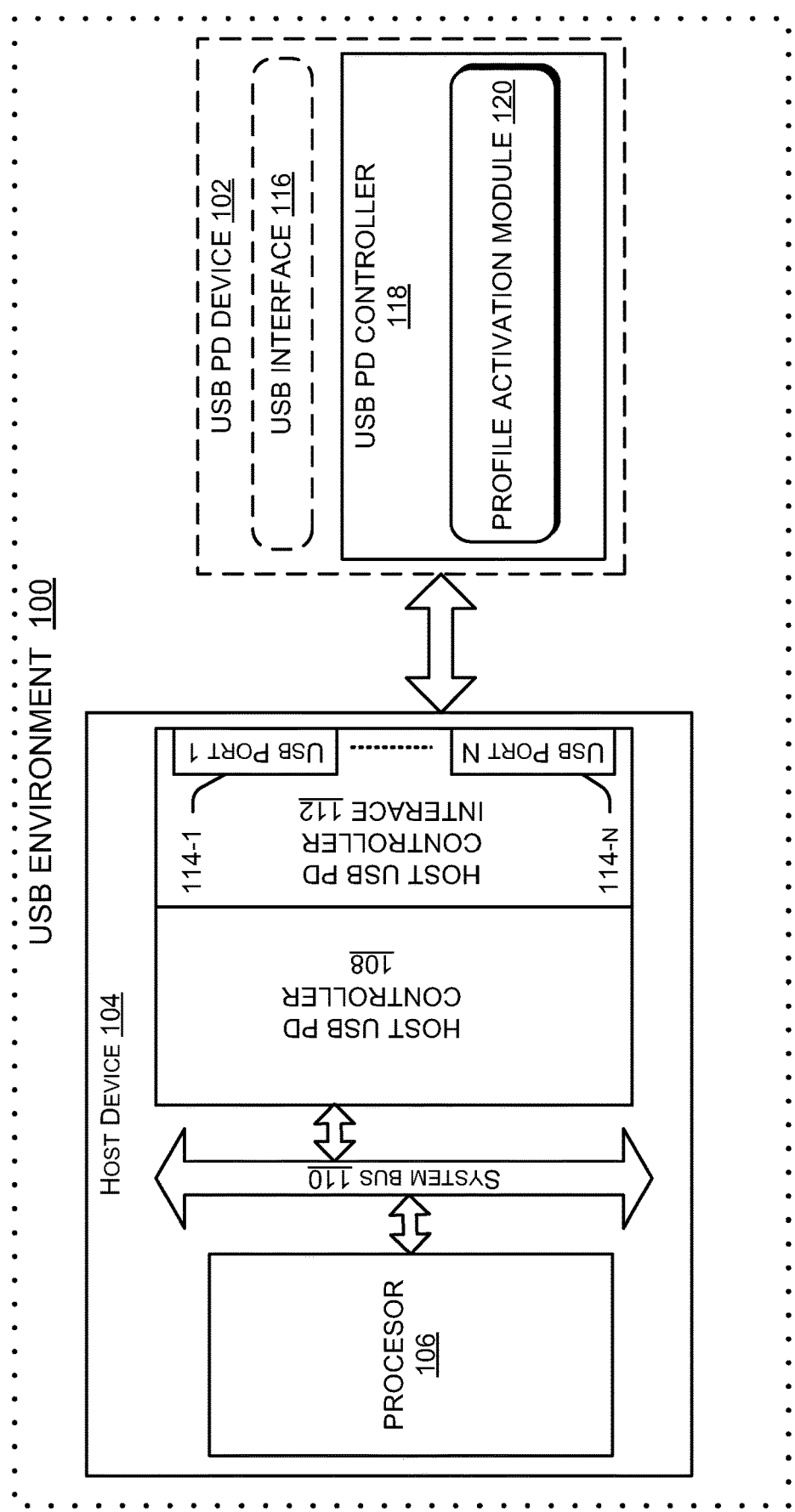
FIG. 1 illustrates a Universal Serial Bus (USB) environment, in accordance with an example implementation of the present subject matter.

The Universal Serial Bus (USB) power delivery (PD) specification defines a protocol, referred to as Power Delivery (PD) protocol to enable USB PD capable devices, to transmit and receive power through their respective USB ports. In the present description, a USB PD capable device, referred to as a USB PD device, a USB device or a USB based device, may be any device that implements the PD protocol and is capable of connecting to another device through a USB port. Examples of the USB devices include user devices, such as smartphones, laptops, tablets, keyboards, and storage devices that transmit data as well as power through the USB ports. The USB devices may also include other devices, such as power adapters that may transfer power through its USB port. The USB devices also include USB cable and connectors that transmit power and data between paired devices. One example of a USB PD device may be a USB Type-C cable that includes a PD controller to implement power transfer functionalities between the paired devices.

When two USB devices are paired, the USB devices exchange information relating to their respective power delivery capabilities with each other and negotiate power requirements to initiate transmission of power from one of the USB devices to the other. Generally, the exchange of information between such paired USB devices is limited to information relating to their respective power delivery capabilities. In case a system event occurs in one of the paired USB devices, information relating to the system event is generally not communicated to the other USB device. A system event may be understood as a change in a machine state, such as an ON state, OFF state, hibernation state and so on, of a device, or occurrence of a user interaction event in the device. The user interaction event may be any of a variety of events that may take place in a device in response to an input from a user, for example, by actuation of a key or button of the device. Since information relating to occurrence of a system event in a USB device is not conveyed to the paired USB device, the paired USB device may take no action corresponding to the system event.

According to an example implementation of the present subject matter, the present subject matter describes techniques for communicating system events between paired USB devices. In an example, occurrence of a system event in a first device is detected, the system event being based on at least one of a change in machine state of the first device and a user interaction with the first device. In response to detecting of the system event, a power delivery protocol (PD) based message is generated and is communicated to a second device. The PD protocol based message is indicative of the system event that has occurred in the first device.

In an example, the PD protocol based message provides for activation of a predefined profile setting, corresponding to the system event occurred at the first device, in the second device. In other words, the second device takes cognizance of the system event in the first device and is enabled to take an action due to activation of a predefined profile setting corresponding to the system event.

For example, a system event of activation of a key in a first device, such as a keyboard may be communicated to a second device, such as a tablet paired to the keyboard to invoke the tablet from a sleep mode. Allowing the second device to react to a system event in the first device may synchronize the first device and the second device in a manner that reduces user intervention in operating the two paired devices and provides for various functionalities, such as efficient power management thereby enhancing user experience.

The above techniques are further described with reference to FIG. 1 to FIG. 5. It should be noted that the description and the Figures merely illustrate the principles of the present subject matter along with examples described herein and, should not be construed as a limitation to the present subject matter. It is thus understood that various arrangements may be devised that, although not explicitly described or shown herein, embody the principles of the present subject matter. Moreover, all statements herein reciting principles, aspects, and implementations of the present subject matter, as well as specific examples thereof, are intended to encompass equivalents thereof.

FIG. 1 shows an example USB environment 100 implementing a USB PD device 102, according to an example implementation of the present subject matter. Examples of the USB PD device 102 include user devices, such as docking stations, headphones, keyboards, and storage devices, such as solid state devices that transmit and/or receive data as well as power through the USB ports and other devices, such as power adapters that may transfer power through its USB port. The USB environment 100 includes a host device 104 communicatively coupled to the USB PD device 102. The host device 104 may be any electronic device, including but not limited to, a desktop computer, a laptop, a monitor, a smart phone, a personal digital assistant (PDAs), and a tablet that implements USB PD protocol to interface with another USB device, such as the USB PD device 102.

The host device 104, among other things, includes a processor 106 and a host USB PD controller 108 communicatively coupled to each other through a system bus 110. The processor 106 may be implemented as one or more microprocessors, microcomputers, microcontrollers, digital signal processors, central processing units, state machines, logic circuitries, and/or any devices that manipulate signals based on operational instructions. Among other capabilities, the processor(s) 106 is configured to fetch and execute computer-readable instructions stored in memory (not shown in figures).

The functions of the various elements shown in the FIG. 1, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

In an example, the system bus 110 may implement a system management bus (SMBus), an integrated circuit (I2C) bus interface, or any other bus interface that may facilitate communication between the processor 106 and the host USB PD controller 108.

In operation, the processor 106 may monitor the host device 102 to determine occurrence of a system event. The system event may include one of a change in machine state of the host device 104 and a user interaction event with the host device 104. The machine state may indicate, for instance, power state of the host device 104. For example, the machine state may be ON, OFF, hibernate, sleep, display OFF with power ON, and the like. The user interaction event may indicate an interaction activity with the host device 104 resulting in a change in an operating parameter, such as power mode, brightness, volume, and contrast of the host device 104. For example, the interaction activity may include, actuation of a key, physical or virtual, to modify brightness of a display associated with the host device 104; to modify volume of the host device 104; to change a power mode of the host device 104. It will be appreciated that the user interaction event may occur in a variety of other ways, for instance, based on an input received from a sensor associated with the host device 104. Thus, the user interaction event is any event that results in a change in the operating parameter of the host device 104.

The occurrence of the system event is communicated to the USB PD device 102 coupled to the host device 104. The host device 104 communicates to other USB based devices, such as the USB PD device 102 in the present example, through the host USB PD controller 108. The host USB PD controller 108 includes a host USB PD controller interface 112 that has at least one USB ports 114-1 . . . 114-N, to which the USB PD device 102 is coupled. In accordance with an example implementation of the present subject matter, the host device 104 and the USB PD device 102 implement a USB power delivery (PD) protocol to communicate with each other. Further, the coupling may be via any type of USB, for instance, type A USB, type B USB, or type C USB.

The host USB PD controller 108 may receive a notification from the processor 106 indicating occurrence of the system event. The notification may also include information pertaining to the system event. For example, the information may indicate whether the system event is due to a change in a machine state or due to an interaction event with the host device 104. Further, the information may also include the details pertaining to the system event, for instance, a current machine state, identity of the key actuated, or a changed value of the operating parameter.

The host USB PD controller 108 may in turn provide the notification indicating the occurrence of the system event to the USB PD device 102 via the host USB PD controller interface 112. The USB PD device 102 may include, among other things, a USB interface 116 to communicate with the host USB PD controller 108. On receipt of the notification, the USB interface 116 determines the occurrence of the system event at the host device 104 and triggers a USB PD controller 118 of the USB PD device 102 to activate a profile setting corresponding to the system event.

In an example, the notification indicative of the system event is a PD protocol based message. To elaborate, the host USB PD controller 108 generates the PD protocol based message based on the system event as detected by the processor 106, and transmits the same to USB PD controller 118. Alternatively, PD protocol based message may be generated by the USB PD controller 118. Details relating to generation of the PD protocol based message are explained with reference to description of FIG. 3.

Upon receiving the PD protocol based message, a profile activation module 120 of the USB PD controller 118 determines the profile setting to be activated on the USB PD device 102 or a client device paired via the USB PD device 102, based on the PD protocol based message.

Various modules described in the description may include routines, programs, objects, components, data structures, and the like, which perform particular tasks or implement particular abstract data types.

Activation of the profile settings initiates, in the USB PD device 102, an action corresponding to the system event in the host device 104. For instance, in response to host device 104 switching to sleep mode, the USB PD device 102 may also enter into a sleep mode. This way a system event that may occur at the host device 104 may be reciprocated at a coupled device, such as the USB device 112 or any other client device that may be in communication with the host device 104 using a USB PD protocol. The communication between the host device 104 and the USB PD device 102 is enabled via the host USB PD controller 108 and the USB interface 116, and exchange of information relating to the system event between the two devices may be achieved without routing the information through the processor 106 of the host device 104.

Figure 2:
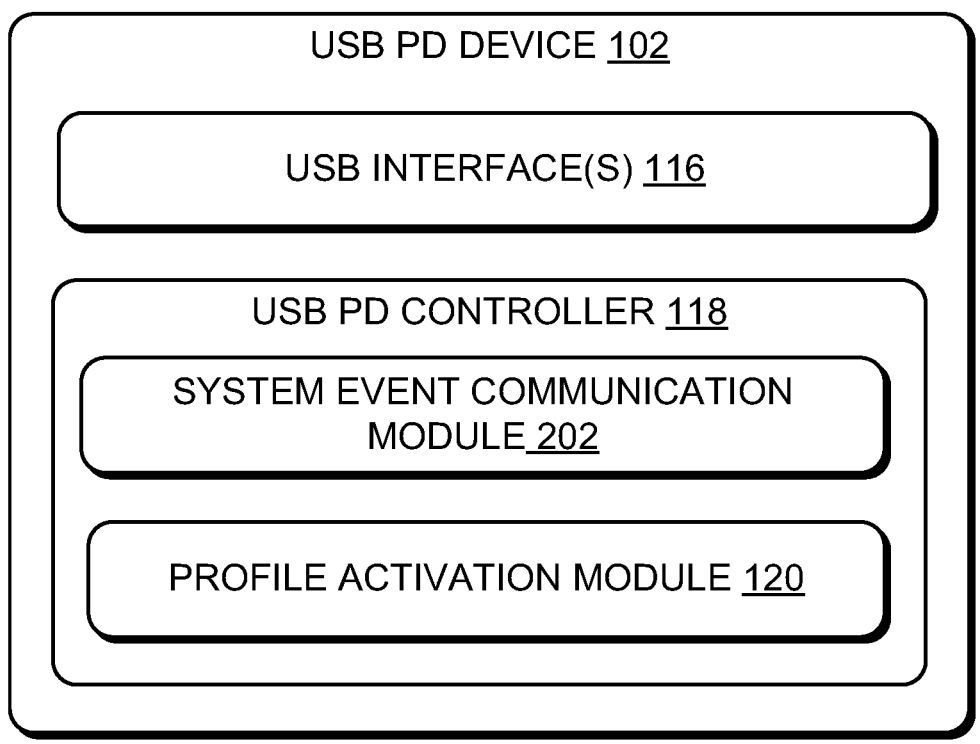
FIG. 2 illustrates a USB power discover (PD) device, in accordance with an example implementation of the present subject matter.

FIG. 2 illustrates various components of the USB PD device 102, in accordance with an example implementation of the present subject matter. As mentioned earlier, the USB PD device 102 activates a profile setting to take a reciprocal action, in response to occurrence of a system event in the host device 104. Thus, in some examples, the USB PD device 102 may be a device that incorporates an integrated USB connector device, for example, a power adapter or a docking station and the profile setting is activated in the USB PD device 102 itself. However, in other examples, the USB PD device 102 may pair a first device, such as a host device 104 with a second device, which may be any client device (not shown in the figures) engaged in a PD protocol based communication with the first device. In such case, as will be understood, the profile setting is activated in the second device.

In an example, the USB PD device 102 includes the USB interface 116 and the USB PD controller 118. The USB PD controller 118 includes a system event communication module 202 in addition to the previously mentioned the profile activation module 120. The system event communication module 202 may receive the PD protocol based message indicative of the system event at the first device. In operation, the PD protocol based message may be provided by the host USB PD controller 108 or may be generated by the USB PD controller 118, as will be explained in detail later in the description.

Based on the PD protocol message, the profile activation module 120 may determine a reciprocal event to be activated in the second device. The reciprocal event may be initiated by activating a profile setting defined for the occurred system event. The profile setting may be defined by the host device 104, while generating the PD protocol based message. Alternatively, information pertaining to each profile setting corresponding to each system event may be pre-defined in the USB PD controller 118.

In an example, a profile setting corresponding to each system event may be defined, based on a type of the first device and the second device that may be paired. In other words, for each device type pair, a profile may be defined, for example, a profile may be defined for a desktop pairing with a laptop, another profile may be defined for a desktop pairing with a tablet, another profile may be defined for a laptop pairing with a docking station, and so forth. Further, each profile may include various settings, each setting indicating a reciprocal event to be activated corresponding to a system event in other paired device.

To determine the profile setting to be activated in the second device, the profile activation module 120 may determine a 'device type' of the first device, based on a device ID field of the PD protocol based message. In an example, the profile activation module 120 may look-up for a profile setting corresponding to the identified 'device type'. Based on the determined profile setting, the profile activation module 120 determines the reciprocal event to be activated when the first device is paired with the second device.

The activation of a profile setting may be better understood with the help of following examples. In an example, the host device 104 may be a display device coupled to the USB PD device 102, which may be a docking station. In said example, the system event of the display device may provide for a reciprocal event to be activated at the docking station. For instance, the system event may be a change in machine state, such as switching from sleep mode to power ON mode. Accordingly, the display device may provide a PD protocol based message as a notification to the system event communication module 202 of the docking station that the display device is now in power ON mode. The profile activation module 120 of the docking station, based on the PD protocol based message, may determine that the docking station is coupled to a display device and may accordingly determine a corresponding profile setting. The profile setting may indicate that the machine state of the docking station is to be synchronized with the machine state of the host device 104. i.e., the display device in the present example. Accordingly, the docking station may be activated to switch to power ON mode, without a user having to switch it on.

It will be appreciated that the principles discussed above may be applied to a case where an occurrence of a system event of a docking station may activate a corresponding profile setting in another paired device, such as the host device 104.

In other example, consider a type-C USB headset, hereinafter referred to as headset, connected to a computer. Here, the headset may operate as the first device where a system event occurs and is reciprocated in the computer functioning as the client device. In said example, a user can use buttons on the headset to play, pause, increase or decrease volume, or perform any other action to interact with the headset. Based on the interaction, occurrence of the system event is detected by the USB PD controller 118 of the headset and is notified to the computer via the system communication module 202 of the headset. Further, the profile activation module 120 may determine a corresponding profile setting, indicating the reciprocal action to be performed at the computer. The profile setting may be communicated to a USB PD controller of the computer, which may perform the reciprocal action. Accordingly, the various actions may be performed at the headset to enable a corresponding action at the computer. For instance, a system event where the audio output volume of the headset is maximized may change the machine state of the computer from a low power mode to power ON mode.

In yet another example, consider a laptop paired to a tablet via a USB device, such as a USB connector device. In said example, even when a paired device is in low power mode or any other state, it will have information pertaining to actions to be taken when a system event occurs in other paired device. For instance, closing of a lid of the laptop may result in activation of a sleep mode of the tablet. In another example, change in brightness of a display of the tablet may be replicated in the laptop.

Thus, the present subject matter provides for syncing up of two paired devices, which are capable of communicating through a PD protocol. Such synchronization may enhance user experience as well as provide for optimum utilization of resources and reduction in power consumption.

Figure 3:
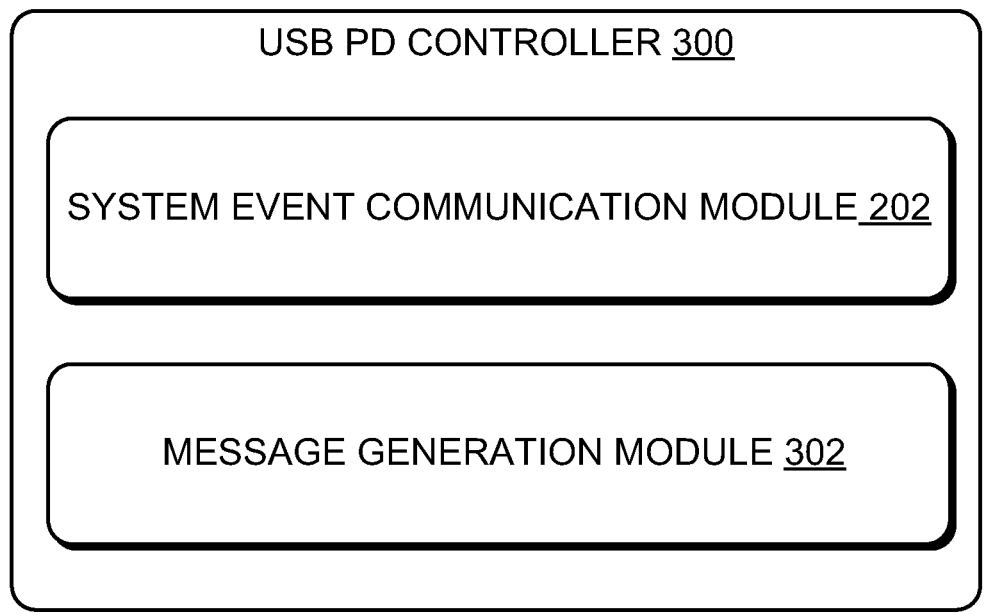
FIG. 3 illustrates a USB PD controller, in accordance with an example implementation of the present subject matter.

FIG. 3 illustrates various components of the USB PD controller 300, according to an example implementation of the present subject matter. The USB PD controller 300 may be any controller based on a USB architecture, which may implement a PD protocol for enabling communication of data and power signals between multiple USB based devices. Thus, each of the USB PD devices, communicating according to the PD protocol based USB architecture, employ a USB PD controller 300 that interfaces it to other USB PD devices.

Referring to FIG. 1, the host device 104 includes a host USB PD controller 108, which communicates with USB PD controller 118 of the USB PD device 102. The USB PD controller 300, may be similar to the host USB PD controller 108 that resides in the host device 104 or may be similar to a USB PD controller that resides in the client device, i.e., the USB PD device 102. In other words, the PD protocol based message may be generated by a USB PD controller of either of the paired devices.

The USB PD controller 300 provides for various functionalities such as, power and capability negotiation between the paired devices. In an example, the USB PD controller 118 may be implemented as a Microcontroller unit (MCU) which may provide for decision making and management of communications between the paired devices. According to an example implementation of the present subject matter, the USB PD controller 300 includes the system event communication module 202 and a message generation module 302 for managing system event related operations of a first and a second USB PD device, such as, any of the host device 104 and the USB PD device 102.

In an example implementation, the system event communication module 202 of the USB PD controller 300 may receive a notification of a system event in the first device, such as the host device 104. As described earlier, the system event may be any such event which may be based on a change in a machine state of the host device 104 and/or a user interaction event. The notification pertaining to the system event may be provided to the system event communication module 202, for example, as an interrupt signal, by the processor 106 of the host device 104. However, it will be appreciated that the notification may be provided in any other form as well, based on a protocol used for communication between the host device 104 and the USB PD device 102.

Upon receiving the notification of the system event, the message generation module 302 generates a PD protocol based message in accordance with the system event. In an example, the PD protocol based message may provide for activation of a predefined profile setting in a second device, such as the USB PD device 102 that may be interfaced with the host device 104 through the USB PD controller 300.

In an example, the message generation module 302 generates the PD protocol based message in according with USB PD Protocol specification. Thus, the PD protocol based message is of a format defined by the PD protocol. For instance, the PD protocol based message may be a Vendor Defined Message (VDM). Further, in an example implementation, the PD protocol based message may be a customized VDM that defines optional modes. The values in fields of a message structure corresponding to the optional mode may be updated by the USB PD controller 300 based on the system event, for notifying the paired device of the details of the system event. Thus, by customizing fields pertaining to the vendor defined message, the USB PD controller 300 may provide information related to the system event as optional modes, which may be communicated as the customized vendor defined messages to the second device.

To understand a structure of the customized vendor defined message, an example format of the PD protocol based message, provided below may be considered:
[16 bit Standard PD Message header] [16 bit VDM Header] [32 bit Optional Mode-Customized VDM] [32 bit Optional Mode-Identifier]

From the above example format, a structure of the PD protocol based message may be considered to include a 16 bit Standard PD Message header, which may include various fields, such as a field defining number of data objects created for the customized vendor message, a message ID field, which is an identifier of the PD protocol based message, and a message type field, which indicates the PD protocol based message is a customized vendor defined message.

The 16 bit Standard PD Message header is followed by a 16 bit VDM header, which may include various fields such as, a vendor ID field indicating a standard vendor ID associated with the customized VDM; a command type field indicating a type of command, for instance, an initiator, an acknowledgement, and a negative acknowledgement; a VDM type field indicating a type of VDM, for example, a structured VDM.

The 16 bit VDM header is followed by a 32 bit Optional mode-customized VDM. The 32 bit Optional mode-customized VDM is included in cases where a PD protocol based message is a customized VDM defining optional modes. The 32 bit Optional mode-customized VDM correspond to a customization performed by the USB PD controller 300 according to the system event. The Optional mode-customized VDM may include a group of bits providing information pertaining to different fields that bear information related to the system event. In an example, a message header of the 32 bit Optional mode-customized VDM may include a set of fields, comprising a machine state flag that is indicative of occurrence of a machine state event; a user interaction flag that is indicative of occurrence of an user interaction event; a machine state data field that is indicative of a type of the machine state event, a user interaction data field that is indicative of a type of the user interaction event. In addition, the 32 bit Optional mode-customized VDM may include fields such as, a machine state identifier that is indicative of a machine state, and a user interaction identifier which may provide details of the system event occurred at the host device 104.

For the ease of understanding, table A below provides an example structure of the PD protocol based message including the Optional mode-customized VDM. The Optional mode-customized VDM of the PD protocol based message may be defined based on each of the various system events that may occur at the host device 104 by the USB PD controller 300. As mentioned previously, the Optional mode-customized VDM of the PD protocol based message is of 32 bits in size and the bits may be divided among the set of fields as below:

| Bit(s) | Field | Value |
|---|---|---|
| | | Message Header |
| 31 | Machine State Message Flag | 1 indicate machine state data is valid |
| 30 | Button/Key Message Flag | 1 indicate Button/Key data is valid |
| 29-25 | Machine State Data | 0 - Power Off<br>1 - Hibernation<br>2 - Standby/Sleep<br>3 - On<br>4 - 31 Other Device Specific State |
| 24 | Button/Key Press/Release | 0 or 1 (Button Pressed or not) |
| 23-16 | Button/Key Set Code | 0 - HID Desktop Keyboard Definition<br>Others - Customized keys and buttons |
| 15-0 | Button/Key ID | ID of standard HID Desktop Keyboard or customized keys and buttons<br>HID Desktop Keyboard Definition is defined in HID usage table |

Table A illustrates various bits in the structure of the Optional mode-customized VDM in the PD protocol based message. As can be seen, bit 31 may be a machine state flag that indicates that the PD based protocol message is based on the system event corresponding to a change in machine state. For instance, value of '1' at bit 31 may indicate that the machine state of the host device 104 has changed. Likewise, bit 30 may correspond to a user interaction flag, such as, a button/key message flag, corresponding to a user interaction where a physical/virtual button and/or a physical/virtual key is operated by a user on the host device 104. Value of '1' at bit 30 corresponding to the user interaction flag may be set to indicate that PD protocol based message corresponds to the user interaction event at the host device 104.

Similarly, bits 29-25 may correspond to the machine state data field and may indicate different types of the machine state events. Different values of bits 29-25 may correspond to various types of the machine state. For example, bit value 0 may indicate ON, bit value 1 may indicate the machine state to be 'Hibernation', and bit values 4-31 may indicate any other device specific state. Further, bits 23-16 and bit 24 may correspond to user interaction events, such as, a bit value of '1' at bit 24 may indicate that the system event may be based on a physical key and/or a physical button actuated at the host device 104. Bits 23-16 may accordingly take different bit value defined for different physical keys and/or customized keys which may be actuated by a user for performing various operations on the host device 104.

According to an example implementation of the present subject matter, the PD protocol based message generated by the message generation module 302 may be communicated to a USB device, such as the USB PD device 102 coupled to the host device 104 and may provide for activating a profile setting at the USB PD device 102 based on the system event. For instance, bit 29-25 of the PD protocol based message may have a bit value '2', indicating that the machine state of the host device 104 is 'Standby/Sleep'.

In some example cases where a PD protocol based message is a customized VDM defining optional modes, the USB PD device 102 may identify the profile setting to be activated according to an identifier provided in the PD protocol based message. In operation, the USB PD device 102 may identify the profile setting to be activated according to an identifier provided in customized VDM, such as, the 32 bit Optional Mode-Identifier described in the above example format. In an example, the identifier may be indicative of a type of the host device 104 where the system event has occurred. An example format of the 32 bit Optional Mode-identifier of the PD protocol based message that may be implemented in such example cases, is provided in table B below:

| Bit(s) | Field | Value |
|---|---|---|
| Message Header | | |
| 31-16 | VID | 0x3F0 |
| 15-0 | DID | 0xABCD |

As can be seen from the table B, a message header is a 32 bit Optional Mode-Identifier of the of the PD protocol based message, where bits 31-16 may correspond to VDM identifier (VID), and bits 15-0 may correspond to a device identifier (DID) for uniquely identifying the host device 104. Thus, in operation, based on accessing the device identifier of the host device 104 from the PD protocol based message, the USB PD device 102 may performing the activation of the profile setting based on the system event indicated in the PD protocol based message.

In an example implementation of the present subject matter, in case the USB PD device 102 ascertains that the second device is incapable of executing the PD protocol based message, it may provide a negative acknowledgement to the system event communication module 202. Accordingly based on the receipt of the negative acknowledgement, the message generation module 302 may terminate generation of PD protocol based messages for any further system event notification received by the system event communication module 202.

Figure 4:
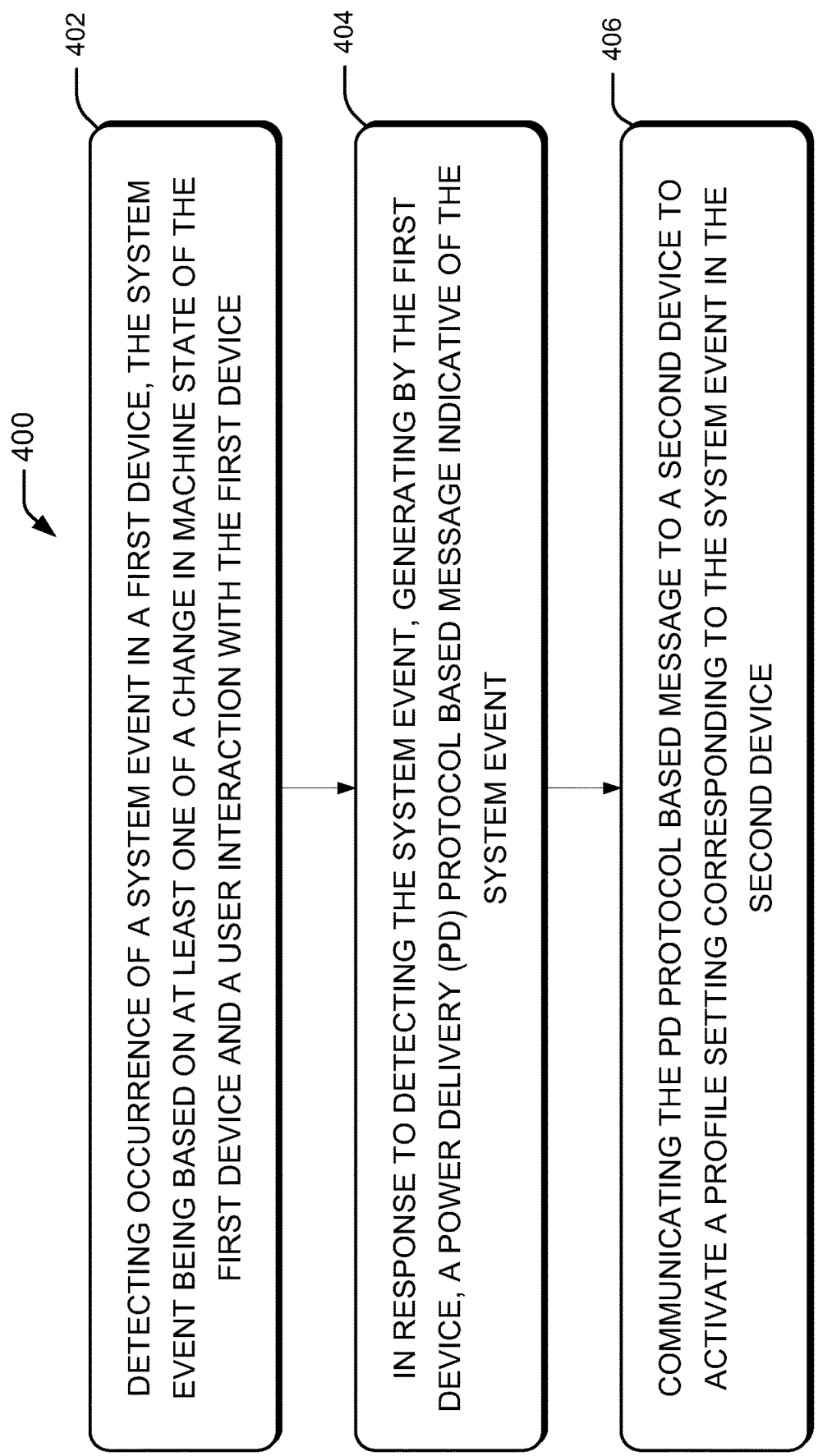
FIG. 4 illustrates a method for communicating system events between paired USB devices, according to an example of the present subject matter.

FIG. 4 illustrates a method 400 for communicating system events between paired USB PD devices, according to an example implementation of the present subject matter. The order in which the method 400 is described is not intended to be construed as a limitation, and any number of the described method blocks may be combined in any order to implement the method 400, or an alternative method. Furthermore, the method 400 may be implemented by processor(s) or computing device(s) through any suitable hardware, non-transitory machine readable instructions, or combination thereof.

It may be understood that steps of the method 400 may be performed by programmed computing devices. The steps of the method 400 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media.

Further, although the method 400 may be implemented in a variety of computing devices, in an example implementation described in FIG. 4, the method 400 is explained in context of a USB connector device that may be implemented to interface a first device and a second device, both being USB PD devices, for the ease of explanation.

Referring to FIG. 4, at block 402, a system event in a first device is detected. The first device may be the host device 104. In an example, the system event may be based on a change in machine state of the first device, wherein the first device changes its state from ON state to an OFF state or from the ON state to any of a sleep, hibernate or idle state and so on. Alternatively, the system event may be based on a user interaction, for example, actuation of a key by a user for providing an input command to the first device.

At block 404, in response to the detection of the system event, a PD protocol based message indicative of the system event may be generated. As explained previously, in an example implementation, the PD protocol based message is generated by the first device. For example, the host USB PD controller 108 of the host device 104 generates the PD protocol based message based on the system event as detected by the processor 106, and transmits the PD protocol based message to the USB PD device 102. However, other example implementations where the PD protocol based message is generated by the USB PD device 102, such as the USB connector device which supports PD protocol are also possible. In such example implementations, the USB PD controller 118 of USB PD device 102 generates the PD protocol based message based on a notification of occurrence of the system event received from the first device. The PD protocol based message includes information relating to the system event in the first device and may be of any type, such as, a VDM.

At block 406, the PD protocol based message is communicated to a second device for activating a profile setting, corresponding to the system event, in the second device. In an example implementation, the PD protocol based message may be communicated via the USB connector device to the second device, such that second device initiates a predefined action, such as a change in the machine state of the second device corresponding to system event. As described earlier, the profile settings may correspond to control settings or a mode of operation of the second device based on the system event that occurred at the first device.

In the description above, method 400 is explained with reference to the USB connector device that connects the first device and the second device. However, it would be understood that either of the first device and the second device may be a USB PD device that incorporates an integrated USB connector device, for example, power adapters, docking stations, plug and play USB devices, and USB based storage devices.

Figure 5:
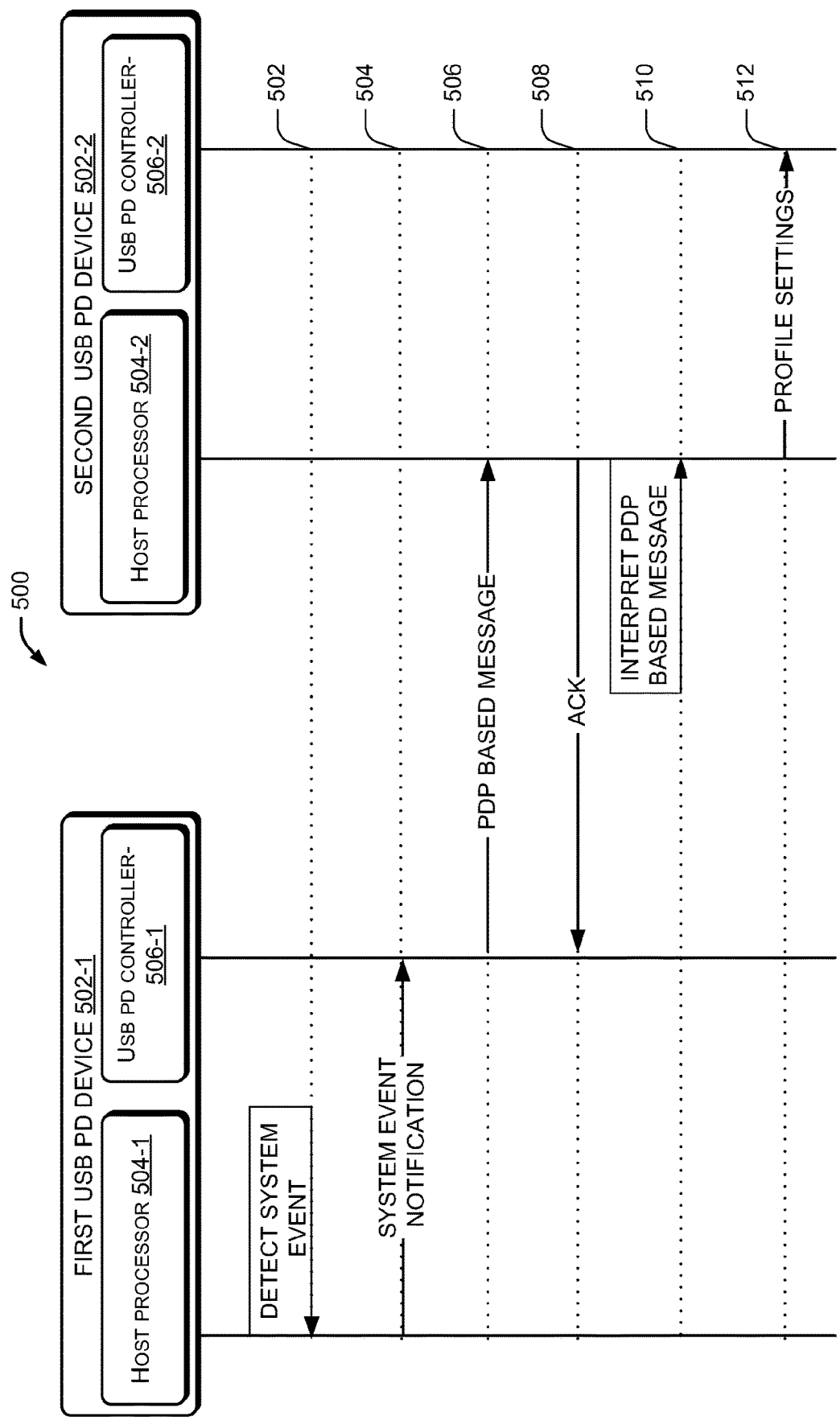
FIG. 5 illustrates a signal flow indicating a procedure for activating a profile setting in a USB device, according to an example of the present subject matter.

FIG. 5 illustrates a signal flow indicating a procedure for activating a profile setting in a USB PD device, according to an example implementation of the present subject matter. In the example illustrated in the signal-flow diagram 500, the activation of the profile setting may be done by a second USB PD device 502-2 based on a system event that takes place in a first USB PD device 502-1. Accordingly, the various arrow indicators used in the signal-flow diagram 500 depict the transfer of signal/information between the first USB PD device 502-1 and the second USB PD device 502-2. Steps for various communications, such as acknowledgement and handshake signals that may be generally performed between the first and the second USB PD devices 502-1, 502-2 have been omitted for ease of depiction.

In an example implementation, at step 502, a host processor 504-1 of the first USB PD device 502-1 may detect that a system event has occurred in the first USB PD device 502-1. A system event may be understood as a change in a machine state, such as an ON state, OFF state, hibernation state and so on of a device, or occurrence of a user interaction event in the device. The user interaction event may be any of a variety of events that may take place in a device in response to an input from a user, for example, by actuation of a key or button of the device. The host processor 504-1, at step 504, notifies the system event to a USB PD controller 506-1 of the first device 502-1.

At step 506, the USB PD controller 506-1 of the first device 502-1 communicates with a USB PD controller 506-2 of the second device 502-2 to convey the notification of the system event to the second device 502-2. The notification is a PD protocol based message, for example, the customized VDM message as described in reference to FIG. 3. In an example, the customized VDM message comprises details of the system event in addition to depicting the occurrence of the system event alone. At step 508, upon receipt of the PD protocol based message from the USB PD controller 506-1, the USB PD controller 506-2 sends an acknowledgement, depicted as ACK in the figure, to USB PD controller 506-1. The acknowledgement allows USB PD controller 506-1 to assess that the second device 502-2 is capable of interpreting the notification of the system event that has been conveyed by way of the PD protocol based message. On the other hand, if no acknowledgement or a negative acknowledgement is received by the USB PD controller 506-1, it is understood that the second device 502-2 is incapable of interpreting the PD protocol based message. In such cases, the USB PD controller 506-1 terminates generation and transmission of PD protocol based messages to the second device 502-2.

Once the USB PD controller 506-2 acknowledges the PD protocol based message, at step 510, the PD protocol based message is interpreted by the USB PD controller 506-2 to identify a reciprocal event to be initiated on the second device 502-2. The reciprocal event may be initiated by activating a profile setting that may be predefined corresponding to the system event notified in the PD protocol based message. Accordingly, at step 512, the USB PD controller 506-2 provides the profile setting corresponding to the system event to a host processor 504-2 of the second USB PD device 502-2 which in turn implements the profile setting for the reciprocal event.

Thus, the methods and systems of the present subject matter provide for communicating system events in USB based devices. Although implementations for the USB environment and the USB PD devices have been described in a language specific to structural features and/or methods, it is to be understood that the appended claims are not necessarily limited to the specific features or methods described. Rather, the specific features and methods are disclosed as example implementations for communicating the system events.

We claim:

1. A method comprising:
   detecting occurrence of a system event in a first device, the system event being based on at least one of a change in machine state of the first device and a user interaction with the first device;
   in response to detecting the system event, generating by the first device, a power delivery (PD) protocol based message indicative of the system event; and
   communicating the PD protocol based message to a second device to activate a profile setting to initiate a system event in the second device that is the same as the system event in the first device.

2. The method as claimed in claim 1 further comprising, receiving from the second device an acknowledgement indicative of a capability to execute the PD protocol based message to activate the profile setting in the second device.

3. The method as claimed in claim 1, wherein the PD protocol based message includes a set of fields comprising at least one of a machine state flag that is to be set to indicate occurrence of a machine state event, a user interaction flag that is to be set to indicate occurrence of an user interaction event, a machine state data field indicative of type of the machine state event, and a user interaction data field indicative of type of the user interaction event.

4. The method as claimed in claim 1 further comprising, terminating the generation of the PD protocol based message upon receipt of a negative acknowledgement indicative of an inability of the second device to execute the PD protocol based message.

5. A universal serial bus (USB) power delivery (PD) device comprising:
   a USB interface to couple the USB PD device to a host device, wherein the USB interface is to identify occurrence of a system event in the host device, the system event being based on one of a change in machine state of the host device and occurrence of an user interaction event in the host device; and
   a USB PD controller coupled to the USB interface, the USB PD controller comprising:
   a system event communication module to receive a PD protocol based message indicative of the system event; and
   a profile activation module to activate a predefined profile setting to initiate a system event on the USB PD device that is the same as the system event in the host device based on the PD protocol based message.

6. The USB PD device as claimed in claim 5, wherein the USB PD controller further comprises a message generation module, to generate a PD protocol based message indicative of a system event occurring in the USB PD device.

7. The USB PD device as claimed in claim 5, wherein the PD protocol based message is a vendor defined message including information relating to the system event.

8. The USB PD device as claimed in claim 5, wherein the profile activation module determines the predetermined profile setting to be implemented to initiate the system event on the USB PD device that is the same as the system event in the host device based on a device identifier provided in PD protocol based message, the device identifier indicating a device type of the host device.

9. The USB PD device as claimed in claim 5, wherein the USB PD device comprises an integrated USB connector device.

10. A universal serial bus (USB) power delivery (PD) controller comprising:
- a system event communication module to receive notification of a system event in a first device associated with the USB PD controller, the system event being based on one of a change in machine state of the first device and occurrence of an user interaction event in the first device; and
- a message generation module, to generate a PD protocol based message indicative of the system event in the first device, wherein the PD protocol based message provides for activation of a predefined profile setting to initiate a second device that is the same as the system event in the first device, wherein the second device is to interface with the first device through the USB PD controller.

11. The USB PD controller as claimed in claim 10, wherein the system event communication module is to receive a negative acknowledgement indicative of an inability of the second device to execute the PD protocol based message, and wherein the message generation module is to terminate generation of the PD protocol based message, on receipt of the negative acknowledgement.

12. The USB PD controller as claimed in claim 10, wherein to generate the PD protocol based message, the message generation module is to define a set of fields comprising at least one of:
- a machine state flag indicative of an occurrence of a machine state event;
- a user interaction flag indicative of an occurrence of an user interaction event;
- a machine state data field indicative of type of the machine state event; and
- a user interaction data field indicative of type of the user interaction event.

13. The USB PD controller as claimed in claim 10, wherein the PD protocol based message is a customized vendor defined message defining an optional mode, the optional mode comprising information relating to the system event.

14. The USB PD controller as claimed in claim 10, wherein the message generation module is to include information relating to the system event to be initiated in the second device in the PD protocol based message.

15. The USB PD controller as claimed in claim 10 further comprising a profile activation module to determine the predefined profile settings to be initiated based on the system event.

* * * * *